April 27, 1943.  J. G. VINCENT  2,317,423
MOTOR VEHICLE
Filed Nov. 17, 1939    6 Sheets-Sheet 1

INVENTOR.
Jesse G. Vincent
BY Tibbetts & Hart
ATTORNEYS

April 27, 1943.   J. G. VINCENT   2,317,423
MOTOR VEHICLE
Filed Nov. 17, 1939   6 Sheets-Sheet 5

INVENTOR.
Jesse G. Vincent
BY
Sebbitts & Hart
ATTORNEYS

April 27, 1943.  J. G. VINCENT  2,317,423
MOTOR VEHICLE
Filed Nov. 17, 1939  6 Sheets-Sheet 6

INVENTOR.
Jesse G. Vincent
BY Sibbetts & Hart
ATTORNEYS

Patented Apr. 27, 1943

2,317,423

UNITED STATES PATENT OFFICE 2,317,423

MOTOR VEHICLE

Jesse G. Vincent, Grosse Pointe, Mich., assignor to Packard Motor Car Company, Detroit, Mich., a corporation of Michigan Application November 17, 1939, Serial No. 304,990

1 Claim. (Cl. 74—328)

This invention relates to drive mechanism and more particularly to drive mechanism for motor vehicles.

An object of the invention is to provide change speed drive mechanism for motor vehicles that permits the floor board to be arranged close to the ground.

Another object of the invention is to provide change speed drive mechanism in which there are two selective forward speed drives that can be utilized or modified in the final drive.

A further object of the invention is to provide change speed mechanism, having two driving speeds that can be modified to provide four driving speeds, that will occupy a relatively small space, that is rugged and reliable, and that can be produced at a relatively low cost.

Another object of the invention is to provide a drive mechanism for motor vehicles in which change speed gearing has a drive modifying mechanism and reverse drive mechanism associated therewith, the reverse drive being positive and circumventing the modifying mechanism in a manner such that the modifying mechanism does not have to be locked out.

Another object of the invention is to provide a change speed and overdrive mechanism in which the drive can be shifted from the lowest forward speed to the highest overdrive forward speed in two ways.

Another object of the invention is to provide drive mechanism that can be readily shifted into or out of either one of two forward speed drives or modified drives of the two forward drives.

Other objects of the invention will appear from the following description taken in connection with the drawings, which form a part of the specification, and in which.

Figure 1:
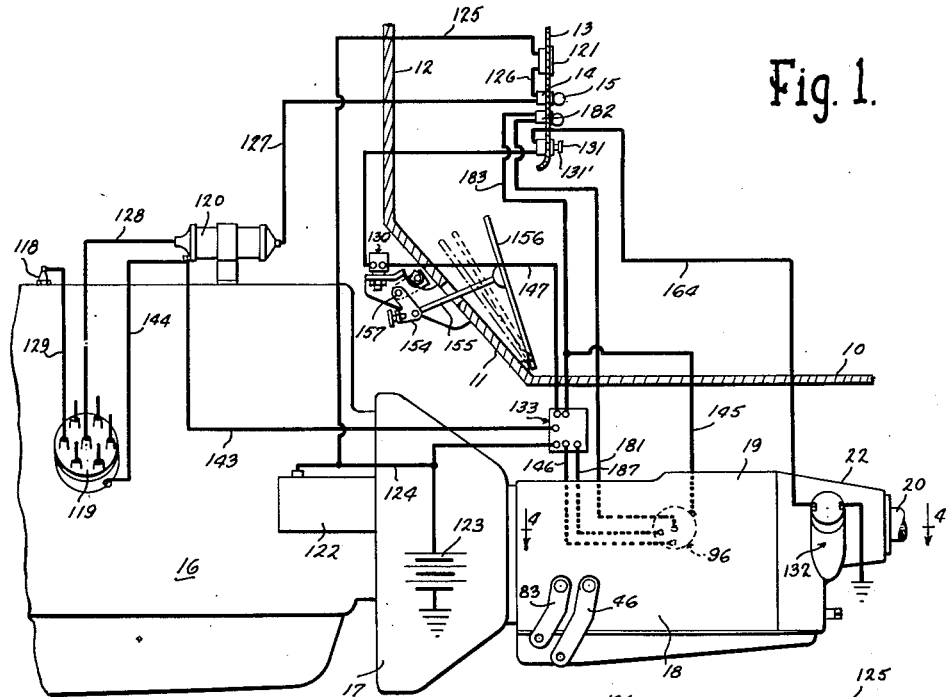
Fig. 1 is a diagrammatic elevational view of a motor vehicle power and transmission plant with control mechanism associated therewith.

Referring to the drawings by characters of reference, 10 represents the floor board of a motor vehicle body having at the front end thereof a toe board 11 terminating at its forward end in dash 12. The instrument panel 13 carries a conventional ignition switch 14 controlled by a key 15.

The drive mechanism consists of an engine 16, a main clutch containing casing 17 at the rear of the engine, a change speed gearing casing section 18 at the rear of the clutch casing, and casing section 19 at the rear of the change speed gearing casing containing drive modifying mechanism, the casing sections 18 and 19 being formed integral with a dividing wall. A tail shaft 20 projects through the rear cover 22 of casing 19 and is formed with an enlarged hollow front end 21.

A driving shaft 23 projects into the front end of casing 18 and is suitably supported by bearing 24, the forward end of such shaft being driven by the engine through a conventional main clutch (not shown). The rear end 25 of shaft 23 lying within casing 18 is enlarged and hollowed out and has peripheral gear teeth 26 and clutch teeth 27 formed thereon. The forward end of a drive shaft 28 is carried by bearings 29 in the hollow end of the driving shaft and extends through the rear wall of casing 18 into casing 19. A suitable bearing 30 supports the drive shaft in the rear wall of casing 18. Gear 31 is rotatably mounted on shaft 28 and has a flange extending forwardly with clutch teeth 32 formed thereon, these teeth being similar to and aligned with clutch teeth 27. The rear end of the driving shaft is formed as a cone clutch element 33 and the forward end of the gear 31 is formed as a cone clutch element 34.

Between the gears 26 and 31 is arranged a shiftable clutch means for selectively drivingly connecting either gear with the drive shaft 28. Clutch hub 35 is slidably splined on shaft 28 and has a toothed periphery 36 with which internal teeth of clutch ring 37 mesh in sliding relation. The ring is axially movable to engage with either the clutch teeth 27 or 32 and spring pressed balls 38 are carried by the hub and engage with recesses 39 in the ring to resist axial movement of the ring relative to the hub. Cone rings 40 are fixed to the hub in relation to engage with cone surfaces 33 and 34 for synchronizing the hub with the clutch 27 or 32 prior to engagement by the clutch teeth 27 or 32 by the ring 37. Thus when the clutch means is shifted to engage either shaft 23 or gear 31 with shaft 28, axial pressure is applied to the ring 37 and the hub 35 will be moved therewith due to the ball engagement until one of the cone rings 40 engages one of the cone surfaces 33 or 34, depending upon the direction of movement, and continued axial pressure against the clutch ring will first synchronize the clutch means with the engaged member and will thereafter unseat the balls 38 from recesses 39 so that the clutch ring can continue its movement to engage either of the clutch teeth 27 or 32. Arms 41 of shifter yoke 42 engage in a recess 43 of the clutch ring and this yoke is pivotally mounted on a shaft 44 and fixed to a shaft 45, such shafts being suitably mounted in casing 18. The shifter yoke can be rocked to actuate the clutch means by suitable mechanism (not shown) connected with lever 46 that is fixed to shaft 45.

A lay shaft 47 extends parallel beneath the drive shaft and is suitably mounted in casing 18. This shaft supports a gear cluster comprising gears 48 and 49, gear 48 being in constant mesh with gear 26 and gear 49 being in constant mesh with gear 31. Direct forward speed drive can be obtained from the driving shaft 23 to the drive shaft 28 through engaging the shiftable clutch means with clutch 27, the drive being from shaft 23 and clutch 27 to ring 37 and hub 25 to shaft 28. When the clutch means engages clutch 32 a forward reduced speed drive is obtained, the drive being from gear 26 to gear 48, gear 49 to gear 31, the clutch 32 to the ring clutch 37 and hub 25 to shaft 28. The change speed gear casing has its opening and cover at the bottom and is thus of the inverted type so that the floor board can clear the casing a minimum distance above the ground.

Figure 6:
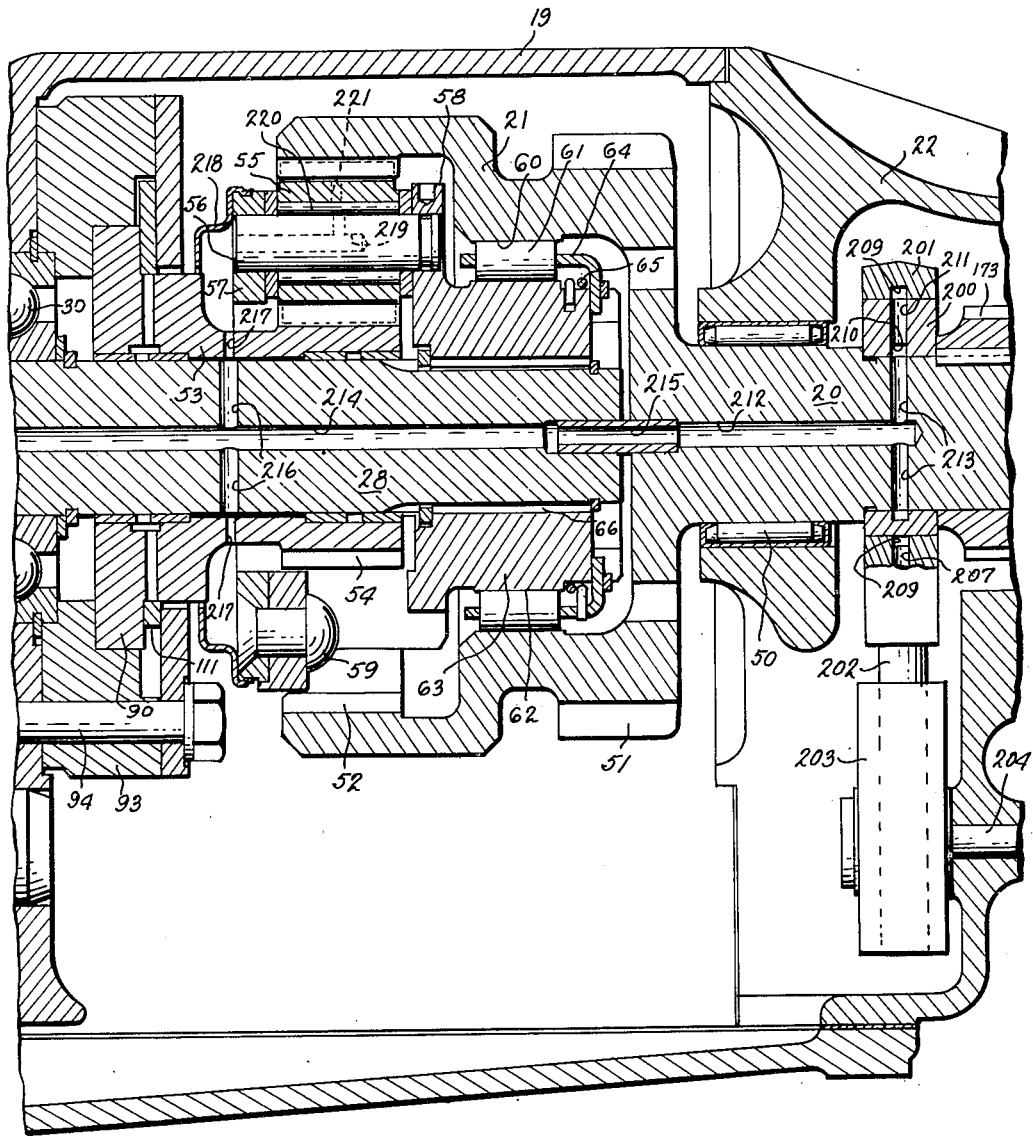
Fig. 6 is a sectional view of the drive modifying mechanism taken on line 6—6 of Fig. 4.

The drive is transmitted from the drive shaft 28 to the tail shaft 20 by mechanism that is operable to modify the driving speed. The tail shaft is carried by a roller bearing 50 mounted in the casing end cover 22 and the enlarged end 21 projecting into the casing has a peripheral gear 51 and an internal gear 52 formed thereon, see Fig. 6. The rear end of the drive shaft 28 projects into this enlarged forward end of the tail shaft and between such telescoping shaft end portions is arranged planetary gearing that is controlled to provide a direct or modified driving connection. A sleeve 53 carrying a sun gear 54 is rotatably mounted on the drive shaft and a plurality of planet gears 55 are arranged between and in mesh with the sun gear and the internal gear 52 on the tail shaft. The planet gears are rotatably mounted on shafts 56 carried by arbor rings 57 and 58 secured together by rivets 59, ring 58 being fixed to the drive shaft 28 as at 66.

The enlarged forward end of the tail shaft is formed with an internal annular surface 60 between gears 51 and 52 against which rollers 61 bear and such rollers also bear against cam surfaces 62 formed on the periphery of a hub 63 extending rearwardly from the arbor ring 58. The rollers are mounted in a ring keeper 64 suitably retained on the hub 63 and normally urged out of driving relation with the cam surfaces by suitable spring means 65. The rollers provide an overrunning clutch connection between the planet gear carrier hub and the tail shaft, the hub 63 being splined of course to the drive shaft as at 66. As the planet gear carrier rotates with the drive shaft, the planet gears will rotate the tail shaft at an increased speed when the sun gear is held stationary or will idle around the tail shaft when the sun gear is free. When the overrunning clutch rollers wedge the cam surfaces 62 with the tail shaft then of course the drive is directly from the drive shaft to the tail shaft through the rollers, but this direct roller drive is broken when the tail shaft overruns the drive shaft. The planetary gearing arrangement can be such that when the sun gear is held stationary the drive through the planet gears will provide "overdrive" or "underdrive," in the present illustration the mechanism provides "overdrive." It will thus be seen that the drive shaft can be selectively driven at two forward speeds and that either of such drives from the drive shaft to the tail shaft can be direct or modified. Four forward speeds are thus selectively possible.

Figure 4:
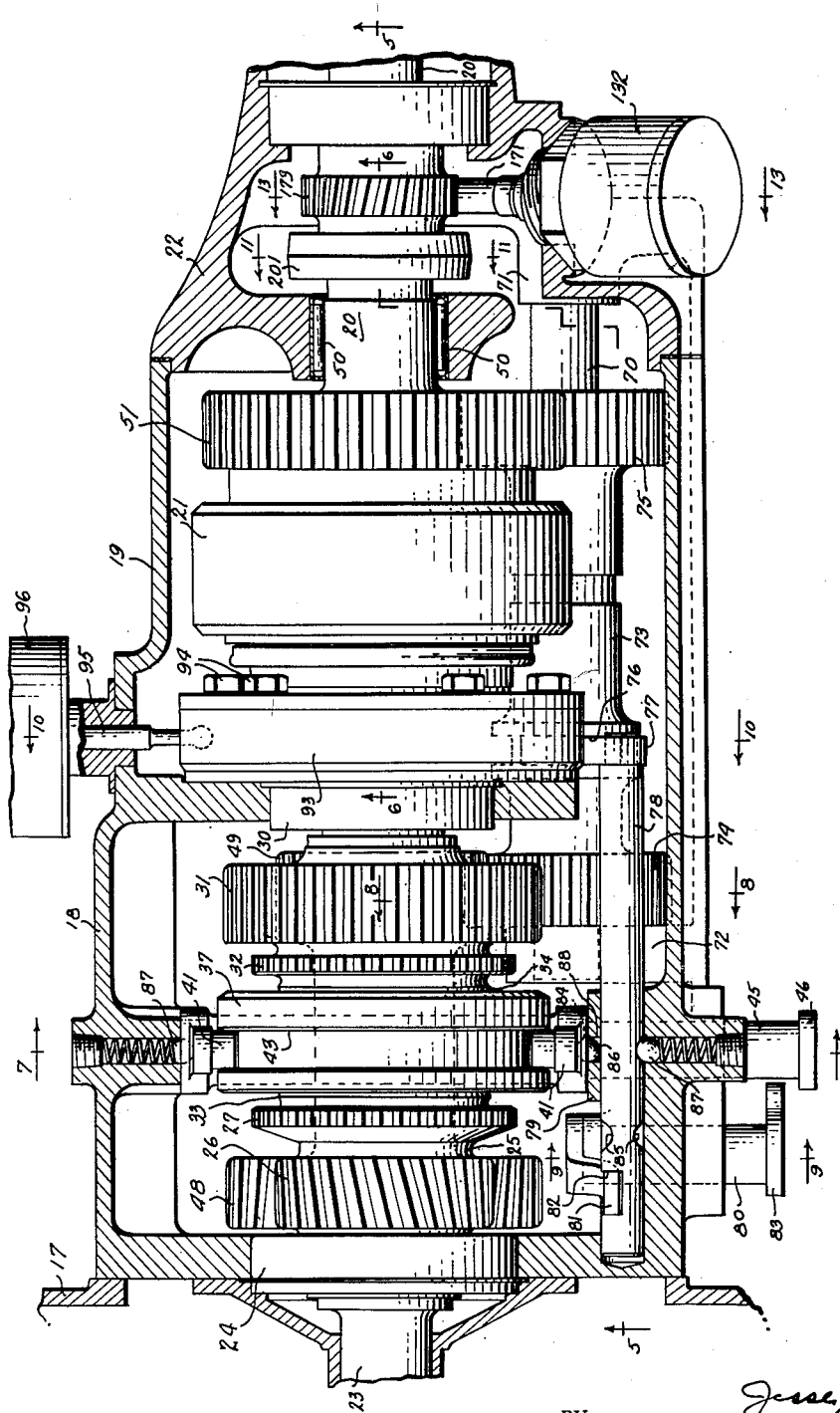
Fig. 4 is a sectional view of the drive mechanism taken on line 4—4 of Fig. 1, showing the same in reverse drive relation.
Figure 5:
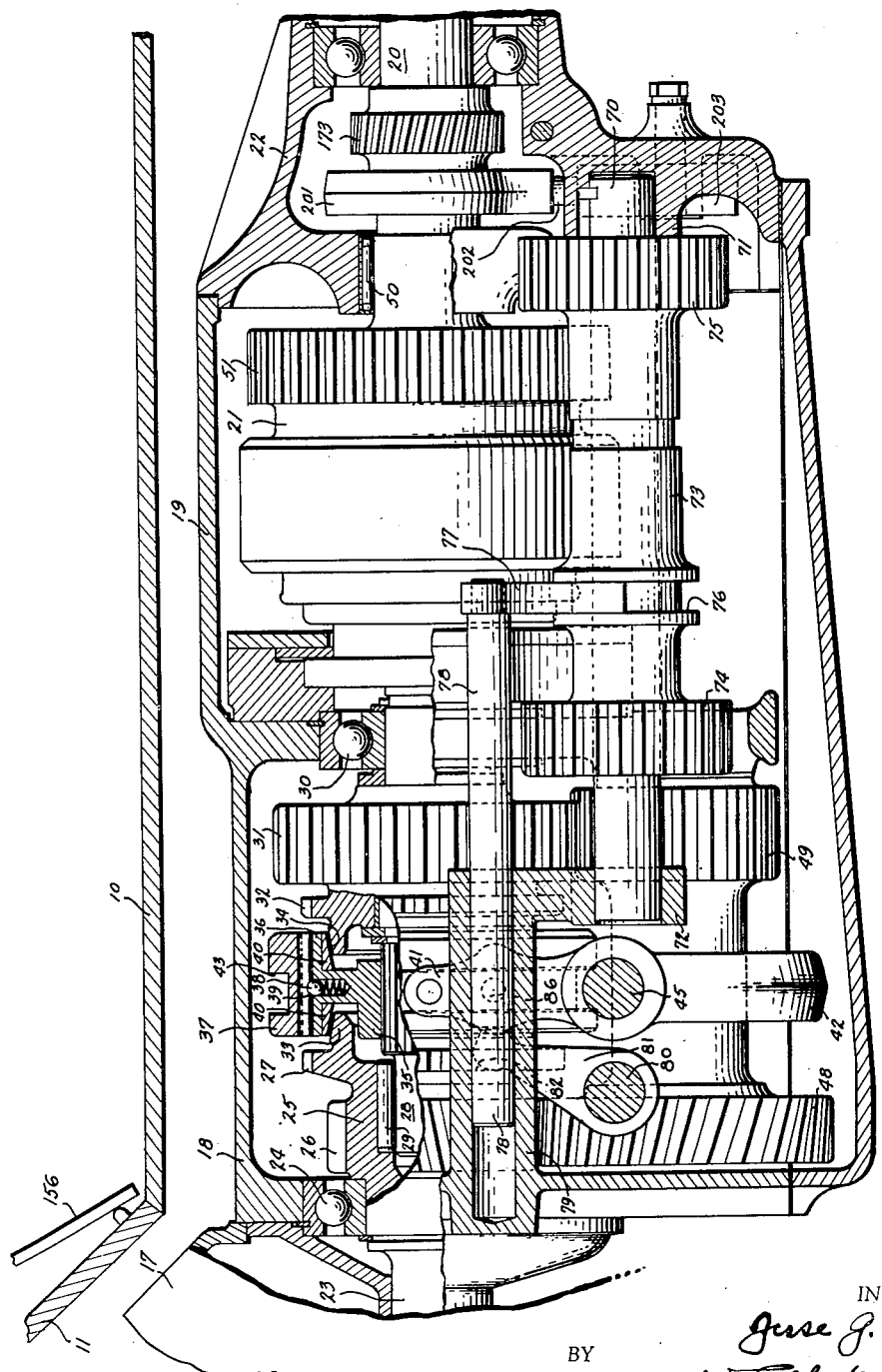
Fig. 5 is a sectional view of the drive mechanism taken on line 5—5 of Fig. 4 with a neutral setting.
Figure 7:
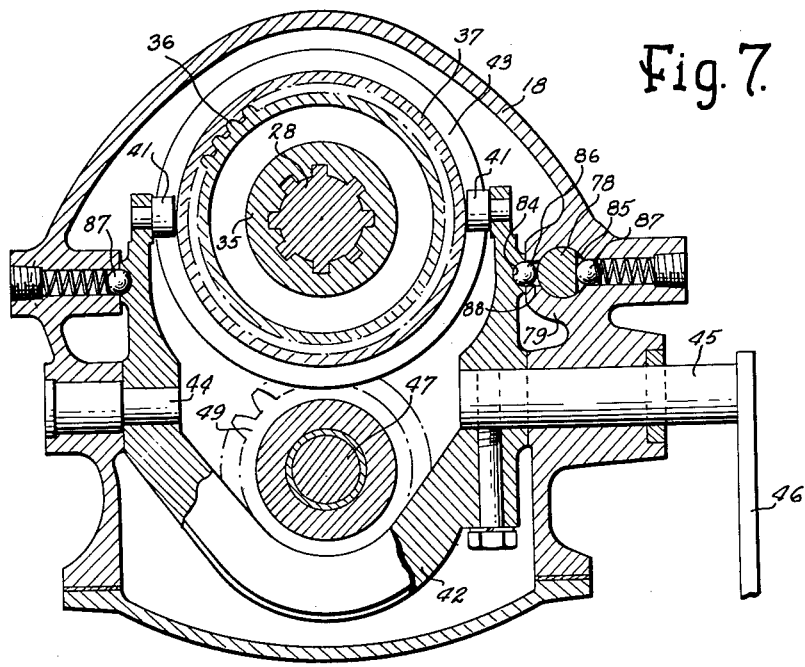
Fig. 7 is a sectional view of the drive mechanism taken on line 7—7 of Fig. 4.
Figure 8:
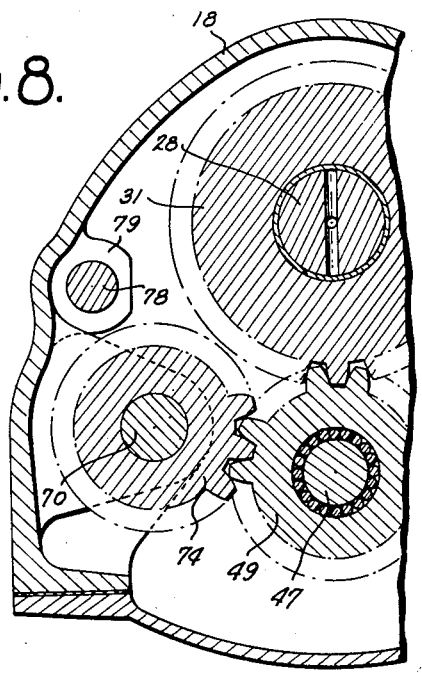
Fig. 8 is a sectional view of the drive mechanism taken on line 8—8 of Fig. 4.
Figure 9:
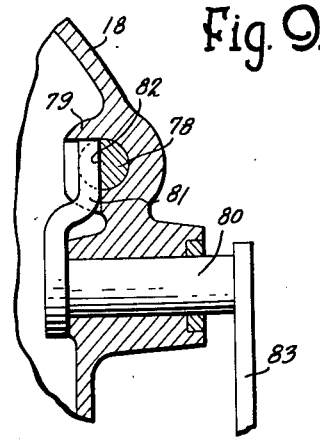
Fig. 9 is a fragmentary sectional view of the control mechanism taken on line 9—9 of Fig. 4.
Figure 10:
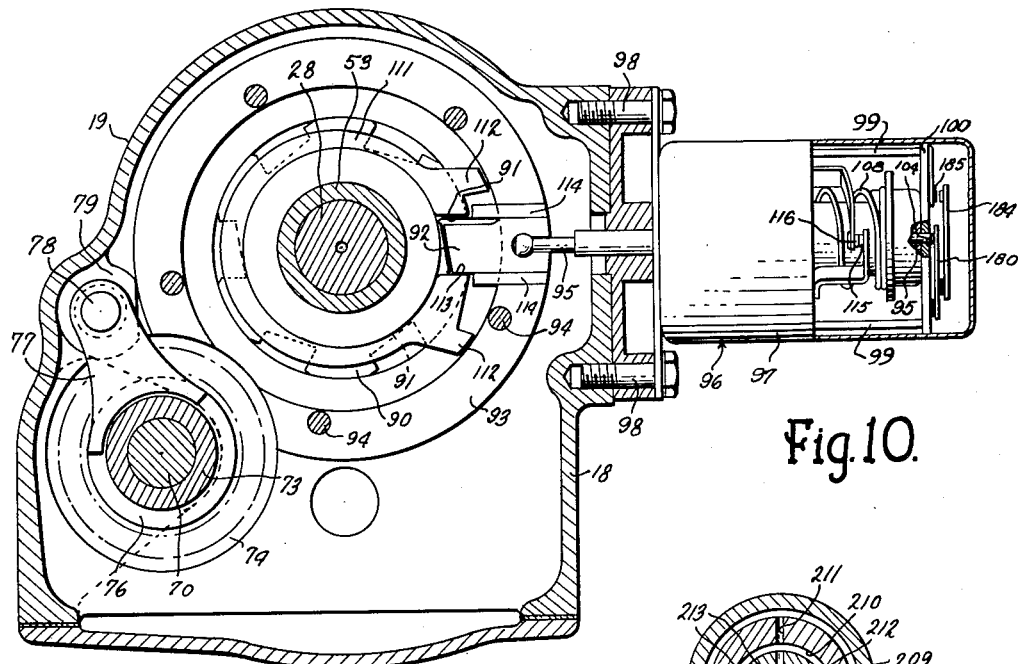
Fig. 10 is a sectional view taken on line 10—10 of Fig. 4, showing the magnetically operated control mechanism.
Figure 12:
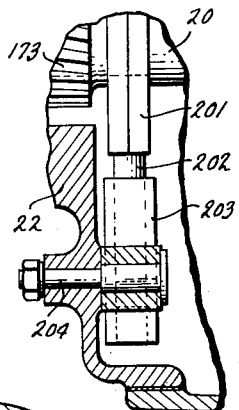
Fig. 12 is a sectional view of the lubricating system taken on line 12—12 of Fig. 11.
Figure 11:
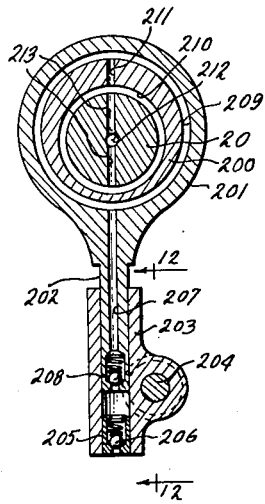
Fig. 11 is a sectional view taken on line 11—11 of Fig. 4, showing the pump for the drive mechanism lubricating system.
Figure 13:
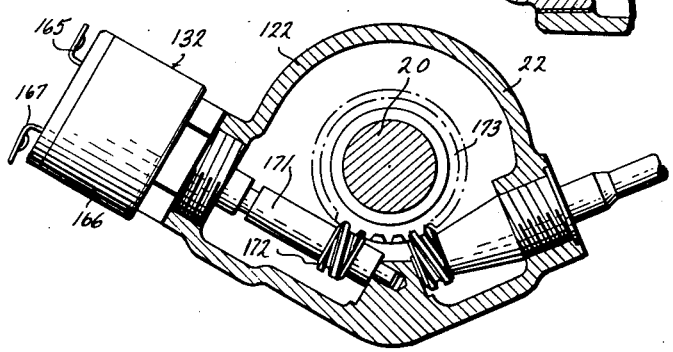
Fig. 13 is a sectional view taken on line 13—13 of Fig. 4.

Reverse drive is obtained by mechanism that is independent of the drive modifying mechanism. Shaft 70 is fixed in bearings 71 and 72 formed in webs of the cover 22 and casing 18 and extends parallel to the lay shaft, drive shaft and tail shaft. A sleeve 73 is shiftably mounted on shaft 70 and fixed on the ends of the sleeve are gears 74 and 75. The sleeve can be shifted to mesh gear 74 with driven gear 49 and at the same time to mesh gear 75 with gear 51 on the tail shaft. As the gear 49 is rotated with gear 26 on the driving shaft, the meshing of gears 74 and 75 with gears 49 and 51 will provide a positive reverse drive from the driving shaft 23 to the tail shaft. The sleeve 73 is formed with a recess 76 in which shifter yoke 77 engages and this yoke is fixed to shaft 78 slidably mounted in an annular sleeve 79 formed in casing 18. Shaft 80 extends through the casing 18 and has an arm 81 fixed on its inner end that extends through a slot in the sleeve 79 and into a slot 82 in shaft 78. Shaft 80 can be rocked by an arm 83 fixed to the outer end thereof and with which suitable actuator mechanism (not shown) can be attached. The reverse drive mechanism is shown shifted into operative relation in Figs. 4 and 7. When the reverse mechanism is in neutral it is entirely disconnected from the operated drive mechanism so that no gear noise results.

Mechanism is associated with the clutch yoke 42 and the reverse shift mechanism so that one will always be locked out while the other is in engaging position. The yoke 42 is formed with a recess 84 and the shaft 78 with a recess 85 adapted to receive a locking ball 86 carried in an opening 88 in sleeve 79. The recesses are so related that they are coincident when the reverse gears are disengaged and the clutch ring 37 is disengaged. When either the yoke 42 or the shaft 78 is shifted from such ineffective position, the ball will move partly into the one that is not shifted and cannot be released until the recesses are again coincident. Thus the reverse mechanism is locked to sleeve 79 when the clutch ring 37 is shifted out of neutral and the clutch ring is locked to sleeve 79 whenever the reverse gearing is in effective driving position. The yoke 42 and the rod 78 are engageable by spring pressed detents 87 carried by casing 18 to retain them in effective positions.

The clutch ring 37 and the reverse shift mechanism are operated preferably manually by the vehicle driver. The planetary gearing portion of the drive is controlled by electrically operable mechanism preferably under control of the engine throttle and a governor.

The forward end of sleeve 53 is formed with an outwardly extending annular flange 90 formed with radially extending peripheral recesses 91 therein. These recesses are arranged to receive a lock member in the form of a pawl 92 slidably mounted in a ring member 93 secured to the forward wall of casing 19 by bolts 94. The pawl is normally disengaged from the sun gear sleeve flange thereby allowing the planetary gearing to idle so that direct drive is established between the shafts 28 and 20 through the overrunning clutch rollers 61. When the pawl projects into one of the recesses 91, the sun gear will be held stationary and the planet gear carrier, being driven by shaft 28, will drive the planet gears around the sun gear and thereby drive the gear 52 of the tail shaft at a faster speed than that of shaft 28.

The pawl 92 that locks the sun gear to establish overdrive is actuated by a rod 95 under the control of an electro-magnetic system including a solenoid indicated generally at 96. The solenoid housing 97 is secured to casing 19 by bolts 98 and fixed in the housing is a pair of rods 99 to the outer ends of which is fixed a cross member 100. Centrally of the casing is fixed a bracket 101 and slidably mounted in the fixed bracket is an armature 102 having a flanged cap portion 103 that covers the hollow end thereof. The rod 95 extends axially through the armature and is slidably associated therewith. On the end of the rod is a contact 104 that is grounded as indicated at 105. Within the hollow portion of the armature is a coil spring 106 bearing at one end against the cap 103 and at the other end against a retainer 107 fixed to the pawl rod. Between the armature cap and the fixed bracket 101 is another coil spring 108 normally exerting sufficient pressure to hold the armature in extended position when the winding coils 109 and 110 of the solenoid are deenergized. The spring 106 is compressed by armature movement when the coils are energized to create sufficient force against the retainer 107, fixed to the pawl rod 95, to press the pawl into one of the recesses 91 in the sun gear sleeve flange upon torque reversal.

The spring 106 when compressed by the armature is charged to move the pawl into a recess 91 in the sun gear sleeve flange but if allowed to do so while the sun gear is rotating breakage would occur, so means is provided to block out the pawl. Frictionally associated with the sun gear sleeve flange is a block-out ring 111 having two spaced ears 112 extending radially therefrom. In the ring and between the ears is a slot 113 into which the pawl must pass in order to enter one of the recesses 91. Rotation of the ring 111 is limited by a pair of plates 114 suitably anchored in casing 19 and arranged to serve as guide means for the pawl. These plates project radially into the space between ears 112 and thus limit rotation of ring 111. The block-out ring rotates frictionally with the sun gear sleeve flange until one of the ears strikes against one of the guide plates where the ring remains and thus the ring blocks movement of the pawl into a recess 91. Upon reversal of the sun gear rotation, the block-out ring will rotate in a direction so that the opening 113 will register with openings 91 permitting the pawl to move into a recess 91 and thus lock the sun gear stationary with casing 19.

Winding coil 110 is arranged to have sufficient capacity when energized to overcome the spring 108 and move the armature toward pawl 92, and the coil 109 is designed to have sufficient capacity when energized to hold the armature in the extended position to which it is shifted by the primary winding coil 110. The winding coil 110 is connected to a contact 115 arranged to extend beyond the movement of the armature cap and in relation to engage the grounded switch arm 116 that lies in the path of movement of the armature cap and normally engages contact 115. Thus when the armature is energized, the movement of the cap will carry the switch arm 116 therewith to disengage it from contact 115 and thereby break the primary coil circuit. The holding coil 109 is grounded, as indicated at 117, so that it will hold the solenoid in the position it has been moved to by coil 110 after the primary circuit to coil 110 is broken. This movement of the armature does not shift the pawl rod 95 but it does compress spring 106 so that the spring will push the pawl rod to engage the pawl with a sun gear notch 91 when torque reversal and movement of the block-out ring permits. When the armature is released by the holding coil then the spring 108 will return it to normal position and this movement of the armature will move the retainer 107 therewith thus moving the pawl rod and pawl to disengaged position and allowing switch 116 to move back into engagement with contact 115. Before the pawl can be disengaged from the sun gear sleeve flange recess a torque reversal is required and this is accomplished by grounding the motor ignition.

The engine ignition system consists of the usual elements including spark plugs, as indicated at 118, a distributor 119, a coil 120, an ammeter 121, a starter motor 122, a battery 123, and switch 14. A conductor line 124 connects the battery with the starter motor, the starter motor being grounded, and a conductor line 125 is connected with the ammeter and line 124. Between the ammeter and switch 14 is a conductor line 126. Between the coil and the ignition switch is a conductor line 127, and between the coil and the distributor is a high tension conductor 128. The distributor is connected to the spark plugs by conductor lines 129 and it is obvious that the spark plugs can function only when the ignition switch 14 is closed.

A plurality of controls for the electric system is provided. One of these controls is a foot operated switch structure indicated generally at 130, another control is a hand operated switch structure at the dash indicated generally at 131, and another control is a governor operated switch structure indicated generally at 132, such controls regulating the action of the solenoid and the ignition.

In the control arrangement is a relay indicated generally by numeral 133 having two movable cores 134 and 135. The core 134 has a disk 136 fixed thereto and core 135 has a contact disk 137 fixed thereto. The disk 136 carries insulated contacts 138 and 139 on opposite faces thereof and is arranged intermediate the contacts 140 and 141, being normally moved for contact 139 to engage contact 141 by coil spring 142. The conductor line 125 associated with the battery and the ammeter is connected with contact 140 and conductor line 143 connects contact 141 with the low tension terminal of coil 120. This same coil terminal is connected with the distributor by a low tension conductor 144. The closing coil 110 of the solenoid is connected by conductor line 145 with the contact 138 and the holding coil 109 of the solenoid forms one end of a conductor line 146 that forms the winding for the relay core 135 and is connected to the conductor line 145 at 145. A conductor line 147 forms the winding for the relay core 134 and is connected to contact 140 at one end and at the other end to a contact 148 in the switch 130.

Switch 130 includes a housing 149 suitably mounted below the toe board having a slidable stem 150 projecting therefrom and carrying the contact disk 151 to establish or break the electrical connection between contact 148 and contact 152. This disk is normally pressed into engagement with the contacts within the switch housing by coil spring 153. Stem 150 projects below the switch housing and into the path of movement of an arm 154 connected by rod 155 with the accelerator pedal 156. This arm 154 is fixed to a shaft 157 that has mechanism connected therewith for controlling the engine throttle opening. The normal operating range of the accelerator pedal is indicated in Fig. 1 between the full line position and the uppermost dotted position so when the pedal is in the full line position the engine is idling and when in the uppermost dotted line position wide open throttle position is obtained. The pedal must be moved below the upper dotted line position, as indicated by the lower dotted lines in Fig. 1, for the arm 154 to move the stem 150 inwardly so that the contact disk 151 will be moved away from contacts 148 and 152. Thus the switch 130 will be closed except when opened by the operation of the accelerator pedal when moved beyond the wide open throttle position.

The switch 132 is connected in series with the switch 131. Conductor line 160 connects the contact 152 with contact 161 and switch 131 includes the contact disk 162 that is arranged to normally connect contact 161 with contact 163. This switch 131 is located at the dash and is provided with a knob 131' by means of which the disk 162 can be pulled out of engagement with contacts 161 and 163.

The switch 131 is connected in series with the governor controlled switch device 132 by means of a conductor line 164 leading from contact 163 to a terminal 165 on the governor housing 166. A grounded terminal 167 leads into the governor housing and terminals 165 and 167 are arranged to be connected or disconnected by an over-center type of switch 168 under the control of a flexible metal strip 169 having its ends fixed to a pair of centrifugally movable weight members 170 mounted on a shaft 171 suitably arranged to be driven by gear 172 meshing with gear 173 fixed on the tail shaft 20. This governor is arranged to flatten the strip 169 to cause the switch 168 to connect terminals 165 and 167 when the vehicle travels above some predetermined speed, for example twenty-four miles per hour when change speed gearing is in direct driving relation. When the vehicle speed falls below approximately twenty-four miles per hour, then the strip 169 is bowed by the centrifugal weights and the over- center switch 168 moves out of contact with terminal 167.

A contact member 180 is mounted on the solenoid cross member 100 and is arranged in the path of movement of the pawl rod 95. This contact member is connected by a conductor line 181 with an indicator light bulb 182 secured to the dash and another conductor line 183 connects the light bulb with contact 138. A switch member 184 is arranged to normally engage a contact 185 that is grounded as indicated at 186. This switch element 184 is connected by conductor line 187 with a stationary contact 188 in the relay, and another contact 189 is connected by a conductor line 190 with the contact 139 of the other relay. The contact disk 137 is arranged to complete or break the circuit between contacts 188 and 189 and spring 191 normally holds the disk away from the contacts.

Assuming that the clutch member 37 is engaged with either clutch teeth 27 or 32 establishing a drive through the change speed gearing and that the ignition is turned on, it is possible to have either a direct drive through the overrunning clutch or an overdrive through the planetary gearing. In order for the drive to be direct from the drive shaft 28 to the tail shaft 20 through the clutch rollers 61, the circuit to the solenoid must be broken and this may be accomplished either by opening the switch 131 at the dash or by opening the foot regulated switch 130. When these two switches 130 and 131 are closed then direct drive through the clutch rollers can be had when the governor switch 132 is open.

The foot switch 130 and the lock-out switch 131 are in series with the governor switch 132. The circuit to the solenoid will thus be broken whenever the foot switch, the dash switch, or the governor switch is open. Whenever the circuit to the solenoid is broken spring 108 will move the armature outwardly after torque reversal in the drive has taken place, and the armature will move the pawl rod therewith to disengage the pawl from the sun gear sleeve flange. When the pawl engages in a sun gear sleeve recess, overdrive is established through the planetary gearing and whenever the pawl is released from the recess then direct drive is established through rollers 61 except when the tail shaft overruns the drive shaft.

Figure 2:
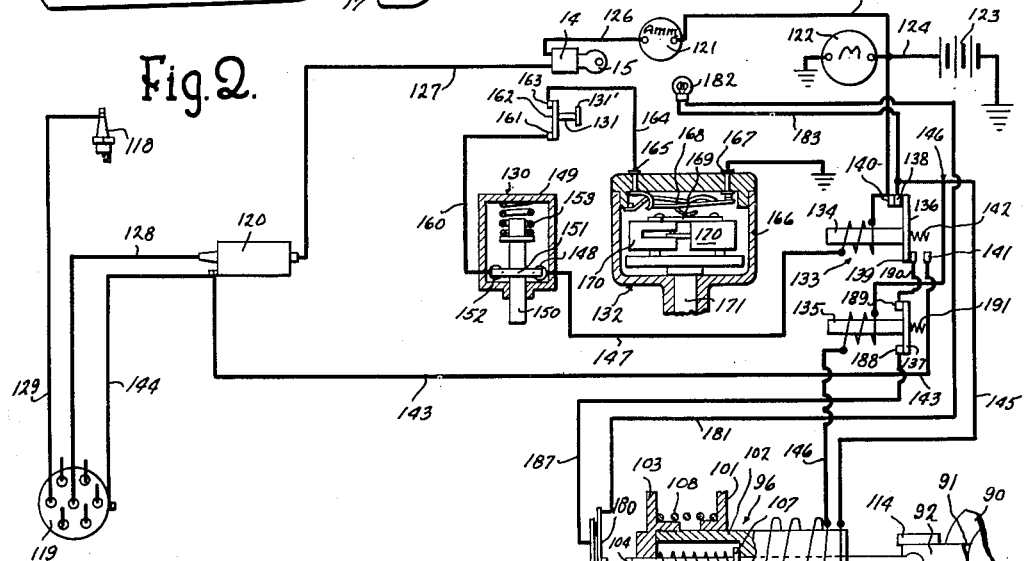
Fig. 2 is a diagrammatic view of the ignition and control circuits when functioning to establish direct drive from the change speed gearing.
Figure 3:
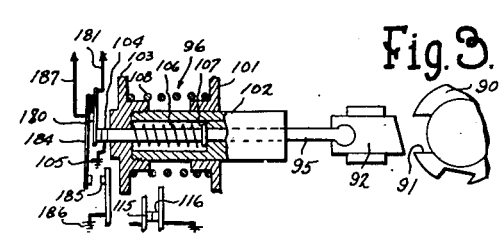
Fig. 3 is a fragmentary view of the control shown in Fig. 2 when set to establish direct drive.

As shown in Fig. 3, the control system is de-energized so that direct drive through the overrunning rollers 61 will take place. In Fig. 2 the control system is energized and the pawl locks the sun gear so that overdrive is established through the planetary gearing. Overdrive can be established only when the vehicle is above the predetermined speed at which the centrifugal switch 132 is closed and after torque reversal occurs, such as by actuating the accelerator pedal in a throttle closing direction. When the weights 170 have moved to flatten spring 169 and engage switch 168 with terminals 165 and 167, line 147 will be energized and relay core 134 will move disk 136 so that contact 138 engages contact 140, such disk movement moving contact 139 away from contact 141. As the closing coil winding 110 is connected to contact 138 by line 145 it will be energized and holding coil 109 will also be energized through conductor 146 that is connected to contact 138. Energizing the conductor 146 will move the core 135 and disk 137 so that contact 189 is connected to contact 188. As the closing coil 110 is energized it moves armature 102 toward the sun gear sleeve flange against the action of spring 108, and such movement of the armature compresses spring 106 but will not change the position of the pawl rod 95 as the pawl is blocked by ring 111 until torque reversal in the drive takes place. Thus as contact 104 engages switch element 180 the light circuit is established when contact 138 is moved into engagement with contact 140. When the armature is moved, as just stated, it carries the switch member 116 therewith as shown in Fig. 2, and breaks the circuit to the closing coil 110 of the solenoid but the armature retains its position because the holding coil 109 is energized and will prevent compressed spring 108 from returning the armature to its normal position. The pawl rod is thus held under spring pressure ready to shoot the pawl into a recess 91 when sun gear torque is released allowing slot 113 to register with the pawl. Such torque reversal is obtained when the driver raises his foot on the accelerator pedal. The purpose of the light is to warn the driver that the pawl is ready to establish overdrive by locking the sun gear and that pedal movement must be made to obtain torque reversal before the sun gear can be locked to establish overdrive. In other words the mechanism is ready to establish overdrive if the accelerator pedal is allowed to rise. As soon as torque reversal takes place the compressed spring 106 pushes the pawl into engagement with the sun gear flange locking it to casing 19 and establishing overdrive. As the pawl rod is thus moved by the spring 106, the contact 104 is disengaged from contact element 180 and thus opens the light circuit.

When the drive mechanism is in overdrive relation, the shift back to direct drive can take place in several ways but due to driving pressure holding the pawl and sun gear sleeve flange together there must be a torque reversal in order for spring 108 to withdraw the pawl from a recess 91. In the present instance this reversal of torque is obtained by temporarily grounding-out engine ignition. The arrangement is such that the grounding-out of the ignition is discontinued under control of the pawl rod and, in addition, the grounding-out will be discontinued within a predetermined time limit if the pawl rod fails to function for this purpose. Such reestablishment of the ignition system will prevent motor failure from the standpoint of ignition failure.

When the mechanism is in overdrive relation, the electrical system is related as shown in Fig. 2. Whenever one of switches 130, 131 or 132 is opened then the circuit through conductor line 147 leading to relay contact 140 is broken and the relay core 134 is deenergized allowing spring 142 to move contact 138 away from contact 140 and engaging contact 139 with contact 141. The holding coil 109 is thus disconnected from contact 140 and releases the solenoid armature, but as spring 108 does not have sufficient strength to overcome the drag of driving torque on the pawl there must be torque reversal before the pawl can be withdrawn from the recess 91 in the sun gear sleeve flange.

This reversal of torque is obtained whenever the circuit through conductor line 147 is broken by actuation of one of the control switches because the engine ignition system will be grounded out. Core 134 when deenergized allows spring 142 to move contact 138 away from contact 140 and closes contacts 139 and 141. Contacts 188 and 189 remain bridged by disk 137 because of the magnetic time delay designed in the relay and as contact 141 is connected to coil 120 by line 143 and as contact 189 is connected to contact 188 the ignition system will be grounded through switch elements 184 and 185. Such ground remains until torque reversal allows spring 108 to release the pawl and such release moves the pawl rod back to a position that disconnects switch element 184 from the grounded element 185 thereby disconnecting the ignition ground-out circuit. The ignition will thus be automatically restored, but in case of failure then the ignition will be definitely renewed after a predetermined time interval as the disk 137 will be moved, at the completion of the magnetic time delay in the relay, by spring 191 to break the contacts 188 and 189 thus opening conductor line 187. This forward drive mechanism between the drive shaft 28 and the tail shaft, and the control thereof, forms the subject matter of co-pending applications Serial No. 276,317 to W. R. Griswold and Serial No. 279,165 to C. R. Paton.

The drive mechanism is positively lubricated by means of a system including a pump device driven by the tail shaft. A cam 200 is fixed on the tail shaft at the rear of bearing 50 and in the cover plate 22. Surrounding the cam is a strap member 201 from which a piston rod 202 extends. The piston rod is slidably mounted in a cylinder 203 that is pivotally carried intermediate its ends by a pin 204 fixed to one side of the rear cover plate 22. A sleeve 205 is fixed in the inlet end of the pump cylinder and carries a spring seated one-way ball valve 206. The piston rod has an axially extending passage 207 extending therethrough and carries a spring seated one-way valve 208 in its inlet end. These valves 206 and 208 both open in the same direction. The strap 201 has an inner circumferential groove 209 formed therein that is in open communication with the passage 207 in the piston rod. The cam 200 has an interior circular groove 210 that communicates with groove 209 by means of a radial passage 211. The tail shaft has an axial passage 212 from which radial passages 213 extend, the latter passages opening to groove 210. An axial passage 214 is formed in the rear end of the drive shaft 28 and a conduit 215 connects passages 214 and 212.

Passage 215 serves as a manifold to distribute lubricant to desired bearings and the planetary gearing. At the forward end of the planetary gearing passages 216 extend radially from the passage 214 in alignment and communicating with radial passages 217 in the sun gear sleeve. Encircling the forward end of the ring 57 is an oil ring 218 that serves to guide oil from passages 217 into passages 219 drilled in the planet gear shafts 56. These passages 219 open to the rollers 220 arranged between the shafts and the planet gears and the planet gears have passages 221 through which oil can flow to their teeth that mesh with gear 52. It will be observed that the passage 214 in the drive shaft extends forwardly beyond the planetary gearing for conducting oil to other bearing portions of the drive mechanism.

The pivotal mounting of the pump cylinder and the cam mounting of the pump piston provides an eccentric pumping action. Thus upon each revolution of the tail shaft, the cam 200 will cause a stroke of the piston so that its movement upwardly from the cylinder draws oil into the cylinder as valve 206 will be opened and in its downward stroke valve 208 will be opened and pressure applied to the oil in the cylinder. The oil under pressure will pass through the piston and passages 209, 211, 210 and 213 to the main feeding manifold 212—214, and from such manifold to the passages leading to and through the planetary gearing. This type of pump is positive in its action, has a small degree of movement and creates relatively little noise.

In a car equipped with this driving mechanism, the driver will have the option of two methods of getting under way from a standing start. He can shift into low direct forward speed, accelerate to some reasonable speed and then shift into direct forward speed, keeping the overdrive out of action until a desired cruising speed has been reached and then he can go automatically into overdrive by releasing the accelerator pedal. This method of shifting from low to direct forward speed even though the centrifugal switch is closed is possible because the accelerator pedal is held down and must be released before torque reversal will allow the block-out ring to engage the pawl to cause overdrive. With the second method, the driver engages the gearing for low direct speed forward, then releases the accelerator pedal to bring in overdrive and he can then shift into direct forward speed while in overdrive unless he presses the accelerator pedal beyond wide open throttle position which would discontinue the overdrive.

It will be seen that when in overdrive with either direct or low speed forward drive engaged, overdrive can be discontinued by pressing the accelerator pedal beyond wide open throttle position because the electrical control will be broken and the ignition will be temporarily stopped to cause torque reversal so that the pawl can be disengaged to free the sun gear. Overdrive can also be discontinued by manually breaking the electrical control circuit at the dash switch 131 or by automatic breaking of the governor switch centrifugally, and then raising the accelerator pedal to permit torque reversal so that the pawl can be removed to free the sun gear. Likewise in going from a direct drive to overdrive through operation of the governor switch, the accelerator pedal must be raised to permit torque reversal so that the pawl can pass the lock-out ring and engage the sun gear. Thus the forward speeds can be shifted back and forth after the centrifugal switch has reversed its action provided the accelerator pedal is not raised or pressed beyond wide open throttle to obtain torque reversal.

It will also be seen that the planetary speed modifying gearing is always in driving relation and that a lock-out or release is not necessary except for the engagement and release of the pawl.

Although the invention has been described in connection with a specific embodiment, the principles involved are susceptible of numerous other applications which will readily occur to persons skilled in the art. The invention is therefore to be limited only as indicated by the scope of the appended claim.

What is claimed is:

In a driving mechanism for motor vehicles, change speed gearing including a drive shaft and a driven gear; a tail shaft having two sets of teeth and a bearing surface; reverse driving means including a shaft having gears at each end operable to engage or disengage the gear and one set of teeth on the tail shaft; planetary gearing including pinions meshing with the other set of teeth on the tail shaft, pinion carrier means fixed to the drive shaft and a sun gear; means operable to hold or release the sun gear; and an overrunning clutch between the tail shaft bearing surface and the pinion carrier means.

JESSE G. VINCENT.